(12) United States Patent
Sellers et al.

(10) Patent No.: US 10,986,128 B1
(45) Date of Patent: *Apr. 20, 2021

(54) HONEYPOT OPAQUE CREDENTIAL RECOVERY

(71) Applicant: Rapid7, Inc., Boston, MA (US)

(72) Inventors: Thomas Eugene Sellers, Georgetown, TX (US); Derek Abdine, Rancho Palos Verdes, CA (US)

(73) Assignee: Rapid7, Inc., Boston, MA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/369,253

(22) Filed: Mar. 29, 2019

(51) Int. Cl.
*G06F 21/45* (2013.01)
*H04L 29/06* (2006.01)

(52) U.S. Cl.
CPC .......... *H04L 63/1491* (2013.01); *G06F 21/45* (2013.01)

(58) Field of Classification Search
CPC ............................ H04L 63/1491; G06F 21/45

USPC .......................................................... 726/26
See application file for complete search history.

(56) References Cited

U.S. PATENT DOCUMENTS

| 10,574,697 | B1 * | 2/2020 | McClintock | ........ H04L 63/1491 |
| 2016/0359876 | A1 * | 12/2016 | Touboul | ............. H04L 63/1491 |
| 2018/0103031 | A1 * | 4/2018 | Niemela | ............. H04L 63/1433 |

* cited by examiner

*Primary Examiner* — Jacob Lipman
(74) *Attorney, Agent, or Firm* — Ashwin Anand

(57) ABSTRACT

Disclosed herein are methods, systems, and processes for recovering opaque credentials in deception systems. A plaintext credential is received at a honeypot and a plaintext lookup table is accessed. It is determined that the plaintext credential does not exist in the plaintext lookup table and the plaintext credential is added to the plaintext lookup table and a protocol specific plaintext lookup table. An opaque credential is generated for the plaintext credential and the opaque credential is added to a protocol specific opaque lookup table.

20 Claims, 13 Drawing Sheets

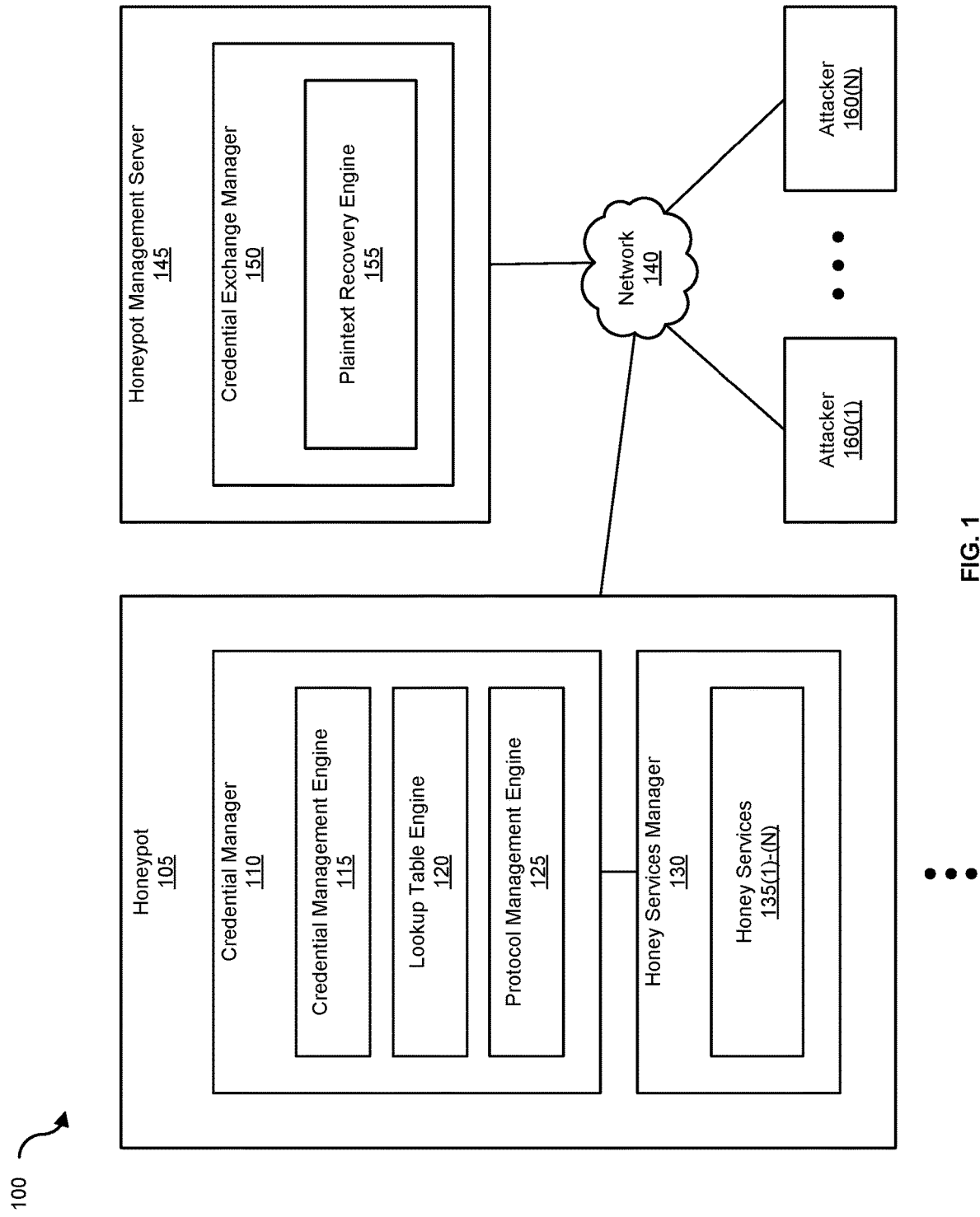

Initial List 210 password
Password1
Summer2018
god
love
admin
• • •

FIG. 2C

Protocol Specific Plaintext Lookup Table 220

| Plaintext 240 | Opaque 245 | Salt 250 | Metadata 255 |
|---|---|---|---|
| Password1 password | 2AFFC6DA AAFCD72A | 1A2B3C 4D5E6F | Context 260(1) Context 260(2) |
| • • • | • • • | • • • | • • • |

FIG. 2D

Plaintext Lookup Table 215 password
new pass
Fall 2018
Go Bears

FIG. 2E

Credential Manager
110

```
{
  "utcts": "2018-10-17T14:56:55.415948Z",
  "proto": "tcp",
  "src": "58.218.66.93",
  "dst": "10.0.17.189",
  "sport": 4386,
  "dport": 3306,
  "hb.connection_class": "mysqld",
  "event": "dionaea.modules.python.mysql.login",
  "auth_method": "mysql",
  "username": "root",
  "password": null,
  "password.hash": "adcfee865fe383e4a7fa4e8813a70dc7c4f3bf38",
  "ref": "conn-b86f6458-8b71-4f1a-9d98-14b77cc1a5ce"
}
```

FIG. 3B

# HONEYPOT OPAQUE CREDENTIAL RECOVERY

BACKGROUND

Field of the Disclosure

This disclosure is related to deception systems implemented in cybersecurity computing environments. In particular, this disclosure is related to recovering opaque credentials in deception systems.

Description of the Related Art

Honeypots are physical or virtual computing systems (e.g., virtual machines) implemented in a network as a decoy to lure malicious actors (e.g., hackers, rogue government entities, and the like) in an attempt to detect, deflect, and/or study hacking attempts. Such deception computing systems can be configured as enticing targets for attackers (e.g., as a high-value server, and the like) and can be used to gather valuable attack telemetry data (e.g., the identity of attackers, attack mechanism(s) used, targets sought, credentials used, and the like). Therefore, honeypots are often implemented in modern cybersecurity computing environments to identify and defend (against) attacks from advanced persistent threat actors.

Honeypots often support protocols (e.g., client/server protocols, communication protocols, and the like) that exchange encrypted (or hashed) credentials (e.g., a username and/or password). While non-plaintext credentials are desirable in production use of such protocols (e.g., for the security benefits they provide by virtue of being encrypted), in a honeypot, encrypted or hashed credentials are rendered opaque. Unfortunately, opaque credentials in a honeypot ecosystem prevent the identification of plaintext credentials being used by malicious attackers and consequently, thwart the gathering of valuable attacker telemetry data. Further, and in addition to various other shortcomings, such opaque credentials may also prevent the honeypot from being configured to only accept logins from one or more specific credentials, thus significantly limiting the effectiveness of the honeypot.

SUMMARY OF THE DISCLOSURE

Disclosed herein are methods, systems, and processes for recovering opaque credentials in deception systems. One such method involves receiving a plaintext credential at a honeypot, accessing a plaintext lookup table, determining that the plaintext credential does not exist in the plaintext lookup table, adding the plaintext credential to the plaintext lookup table and to a protocol specific plaintext lookup table, generating an opaque credential for the plaintext credential, and adding the opaque credential to a protocol specific opaque lookup table.

In one embodiment, the plaintext credential is received from an original attacker and the original attacker initiates an original attack event. In this example, the method involves generating attack context metadata associated with the original attack event and storing the attack context metadata in the protocol specific opaque lookup table in association with the plaintext credential and the opaque credential.

In some embodiments, the method involves receiving the opaque credential at the honeypot from a subsequent attacker that initiates a subsequent attack event, accessing the protocol specific opaque lookup table, and recovering the plaintext credential associated with the opaque credential. In other embodiments, the method involves performing a registration operation with a credential manager by providing a table identifier and a protocol methodology and populating the plaintext lookup table from a plaintext password list.

In certain embodiments, the method involves storing the opaque credential in a log generated for the original attack event or determining whether the opaque credential is included in a list of credentials the honeypot is configured to consider valid. In this example, the method exchanges the plaintext credential, the opaque credential, and the attack context metadata with a credential exchange manager.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 1 is a block diagram 100 of a honeypot that performs opaque credential recovery, according to one embodiment of the present disclosure.

FIG. 2C is a block diagram 200C of an initial list, according to one embodiment of the present disclosure.

FIG. 2D is a block diagram 200D of a protocol specific plaintext lookup table, according to one embodiment of the present disclosure.

FIG. 2E is a block diagram 200E of a plaintext lookup table, according to one embodiment of the present disclosure.

FIG. 3B is a block diagram of a credential manager that performs opaque credential recovery, according to one embodiment of the present disclosure.

Figure 2A:
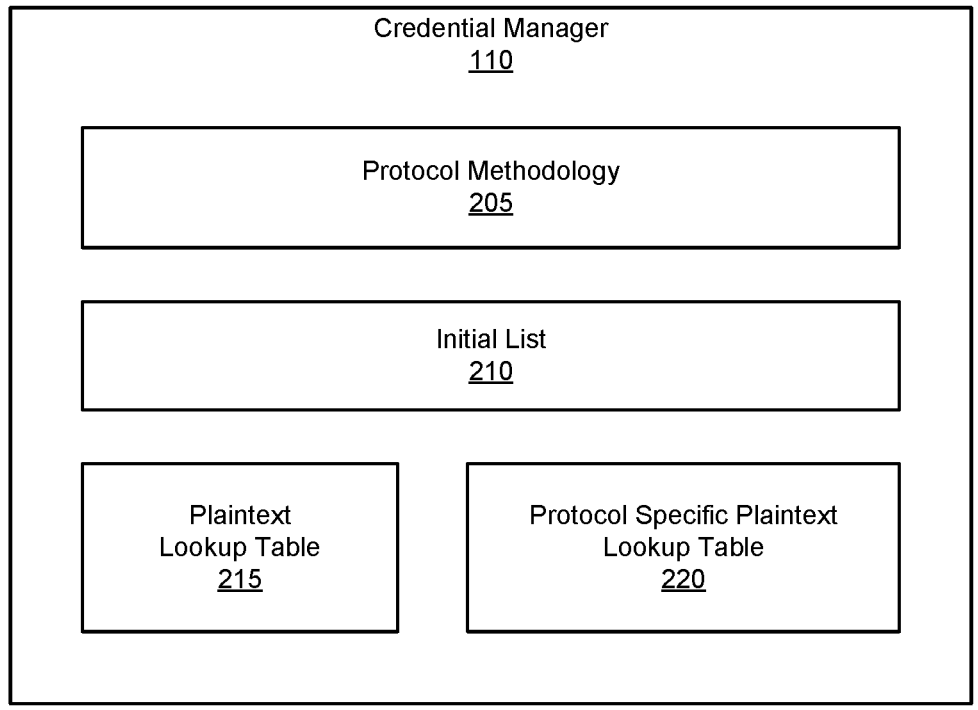
FIG. 2A is a block diagram 200A of a credential manager, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

In modern cybersecurity computing environments, passwords remain the primary means for online authentication and therefore must be protected when stored on a server. Encryption, which is a two-way function (e.g., what is encrypted can be decrypted with the proper key), is one option. However, encryption is inherently weak because a server authenticating a password must have the key to decrypt the password. A malicious attacker who steals a file of encrypted passwords, might also steal the key.

Hashing is a better option, especially with use of a strong hashing algorithm and appropriate salt. Hashing provides a one-way function that scrambles plaintext to produce a unique message digest—there is no way to reverse the hashing process to reveal the original password. In most cases, the only way to recreate the input data from an ideal cryptographic hash function's output is to attempt a brute-force search of possible inputs to determine whether they produce a match, or use a rainbow table of matched hashes. Therefore, a malicious attacker who steals a file of hashed passwords must then guess the password.

For example, a user enters a username and a password into a browser and sends the credentials (e.g., over a secure link) to an authentication server. The server uses the username to look up the associated message digest. The password submitted by the user is then hashed with the same algorithm, and if the resulting message digest matches the one stored on the server, the credentials are authenticated. Examples of some commonly used hashing algorithms include, but are not limited to, Message-Digest algorithms (e.g., MD4, MD5, and the like) and Secure Hash algorithms (e.g., SHA-2, SHA-256, SHA-512, and the like).

In hashing-based authentication, the server does not store or need to see plaintext passwords. Therefore, a compromised hashed file is not particularly useful to a malicious attacker because the hashing process cannot be reversed. However, because users rarely use completely random passwords, the attacker can run commonly used passwords through a hashing algorithm and get a list—called a rainbow table—of associated message digests for these passwords. A file of stolen password hashes can then be compared against the rainbow table because for every match, the rainbow table reveals the password for that hash.

Protection against brute-force attacks and/or rainbow tables is provided by salting the hash—e.g., by adding a random number to each password before the password is hashed (an arbitrary number that can be used just once in cryptographic communication is called a nonce). Therefore, a salt is random data that is used as an additional input to a one-way function that hashes a password. The resulting message digest is the product of both the password and the salt value and will not match any value on a rainbow table. Although an attacker can try adding random values to common passwords to find a matching hash, this process is so cumbersome that the return on investment in attempting to compromise a stolen file of properly hashed and salted passwords is essentially worthless.

Therefore, hashing is commonly employed to safeguard passwords in modern cybersecurity computing environments that require authentication. Because such computing environments also implement deception computing systems, honeypots operating in such ecosystems are often configured to support protocols that exchange hashed credentials (e.g., client/server protocols and/or communication protocols associated with MySQL (Structured Query Language), SMB (Server Message Block), PostgreSQL, and the like). While hashed credentials are necessary (and even desirable) in the production use of such protocols (e.g., to effectuate password security), in a honeypot ecosystem, opaque credentials present significant challenges to honeypot implementation, functionality, and effectiveness.

Because a honeypot's primary role is to deceptively gather attack telemetry data, opaque credentials function as a substantial roadblock to effective attack intelligence gathering. For example, in addition other shortcomings, opaque credentials (e.g., hashed passwords) prevent the identification of plaintext credentials being used by malicious attackers and also prevent the honeypot from being configured to only accept one or more specific credentials, thus significantly limiting the effectiveness of the honeypot.

Disclosed herein are methods, systems, and processes for honeypot opaque credential recovery. Recovering opaque credentials in deception systems using and/or implementing the disclosed methods, systems, and/or processes provides, among other benefits, the identification of plaintext credentials used by malicious attackers and the ability to configure honeypots to accept specific credentials.

Example Honeypot Opaque Credential Recovery System

FIG. 1 is a block diagram 100 of a honeypot 105 that performs opaque credential recovery, according to one embodiment. Honeypot 105 is a physical or virtual computing system (e.g., a virtual machine) that includes at least a credential manager 110 and a honey services manager 130. Credential manager 110 includes at least a credential management engine 115, a lookup table engine 120, and a protocol management engine 125. Honey services manager 130 includes at least honey services 135(1)-(N).

Honeypot 105 is communicatively coupled to a honeypot management server 145 via network 140, which can be any type of network or interconnection. Honeypot management sever 145 includes at least a credential exchange manager 150 which includes at least a plaintext recovery engine 155. Network 140 is subject to one or more malicious attacks that present credentials for authentication (e.g., a username and a plaintext password or opaque password) from one or more of attackers 160(1)-(N).

In some embodiments, and as shown in FIG. 1, credential manager 110 is configured with credential management engine 115 to enable honeypot 105 to recover enciphered, hashed, or otherwise obscured credentials by using a shared and/or protocol specific lookup table generated by lookup table engine 120 using a network or application protocol specific methodology or algorithm (and any associated requirements such as salts and/or plaintext values) managed by protocol management engine 125. In other embodiments, credential manager 110 feeds plaintext credentials captured by honeypot 105 via one or more protocols (e.g. MySQL, SMB, PostgreSQL, and the like) into credential exchange manager 150.

In certain embodiments, credential exchange manager 150 exchanges plaintext credential lists between honeypots in a managed honeypot environment (e.g., provided by honeypot management server 145 as shown in FIG. 1). In this example, credential exchange manager 150 provides or facilitates at least (1) deduplication of list entries, (2) generation of frequency metrics with the goal of permitting client honeypots to determine which credentials to store when resource constrained, and/or (3) centralized brute force, dictionary, or other malicious attacks against unknown values where the resources to do so exceed the capabilities of the client honeypots or where centralization is more efficient.

In one embodiment, credential manager 110 (which describes code, class, module, service, and/or any other type of honeypot-level implementation of the systems, methods, and processes to perform honeypot opaque credential recovery) includes, but is not limited to, lookup tables, plaintext dictionaries, protocol specific algorithms, and shared implementations of cryptographic primitives and logic. In another embodiment, credential exchange manager 150 is an inter-honeypot level implementation of the systems, methods, and processes to perform honeypot opaque credential recovery facilitated by honeypot management server 145.

In some embodiments, opaque credentials include authentication information such as usernames, passwords, cryptographic keys, and the like, that have been encrypted, hashed, or otherwise transformed from plaintext authenticators. In other embodiments, plaintext credentials are original human or machine readable authenticators such as usernames, passwords, tokens, cryptographic keys, and the like. In one embodiment, the term "salt" as used in the instant application includes a salt, a nonce, or a server challenge. For certain protocols, such a value may be a nonce that indicates that the value should be used only once.

Example Limitations Caused by Opaque Credentials in Existing Honeypot Ecosystems In existing honeypot implementations, opaque credentials are typically logged and then manually extracted and recovered outside the honeypot ecosystem. Unfortunately, doing so removes the contextual value of the (credential) data and prevents valuable operations such as queries, alerts, and reporting (e.g., from a Security Information and Event Management (SIEM) system). Additionally, opaque credentials where the plaintext is unknown and of complex construction require significant computing resources to recover. Often, opaque credentials are not logged at all since existing honeypot implementations do not provide a facility for recovery. Therefore, the value from gathering contextual attack telemetry data is lost.

Honeypots often expose honey services which, by protocol design exchange encrypted or hashed credentials (e.g., user ID and/or password). These credentials are not plaintext (human readable) and thus are unknown to the honeypot (e.g., they are opaque credentials). Unfortunately, when malicious attackers communicate with these honey services (e.g., for authentication purposes, and the like), the (opaque) credentials generally cannot be utilized for making decisions by honeypot logic and thus have limited value within the context of honeypot logs.

For example, MySQL clients do not authenticate to servers by providing plaintext passwords. Instead, such clients hash the user's password with a server provided challenge value. This hash is then transmitted to the server which repeats a portion of the foregoing process to verify the user's identity. From a honeypot perspective, this means that plaintext credentials cannot be captured on the wire (although the plaintext value can be derived under certain circumstances). Given that the hashing methodology is public and the honeypot controls the challenge value, the password plaintext can be derived using a brute force technique (e.g., trying many plaintexts). However, as noted, this technique is sub-optimal if the honeypot's hardware does not have sufficient processing power (or memory capacity) to permit the plaintext to be determined and the event logged in near real time.

Therefore, to address the limitations experienced by honeypots and honeypot ecosystems that encounter opaque credentials, in certain embodiments, credential manager 110 and credential exchange manager 150, either alone or in combination, perform recovery and logging of plaintext values corresponding to opaque credentials within the original context of the attack, limit access to specific 'valid' credentials for protocols that exchange opaque credentials (e.g., permitting logins from username 'sa' with password 'MyAccountingApplication'), and gather and leverage credentials used by attackers that would not otherwise be included within common credential lists (e.g., the most frequently used passwords for a given protocol).

Example Credential Manager and Honey Services

FIG. 2A is a block diagram 200A of credential manager 110, according to one embodiment. In addition to credential management credential management engine 115, lookup table engine 120, and protocol management engine 125, credential manager 110 includes at least a protocol methodology 205, an initial list 210, a plaintext lookup table 215, and a protocol specific plaintext lookup table 220.

Protocol methodology 205 includes implementations of protocol specific algorithms needed to convert plaintext credentials to opaque credentials. In one embodiment, implementations of cryptographic primitives or constructs can be optionally centralized into credential manager 110. Initial list 210 is a list of common or likely passwords to seed plaintext lookup table 215 upon honeypot startup or initiation of a new honey service.

In some embodiments, protocol specific plaintext lookup table 220 (e.g., global and/or per protocol lookup table) holds information about plaintext values, corresponding opaque values, and other values such as salts, and the like, required by a hashing (or encryption) algorithm. In one embodiment, the entry count (size) of protocol specific plaintext lookup table 220 can be configurable to limit the computing resources required by honeypot 105. In another embodiment, credential manager 110 includes plaintext lookup table 215 that includes only plaintext values so that credential manager 110 can determine whether an observed value has been previously encountered by honeypot 105.

Figure 2B:
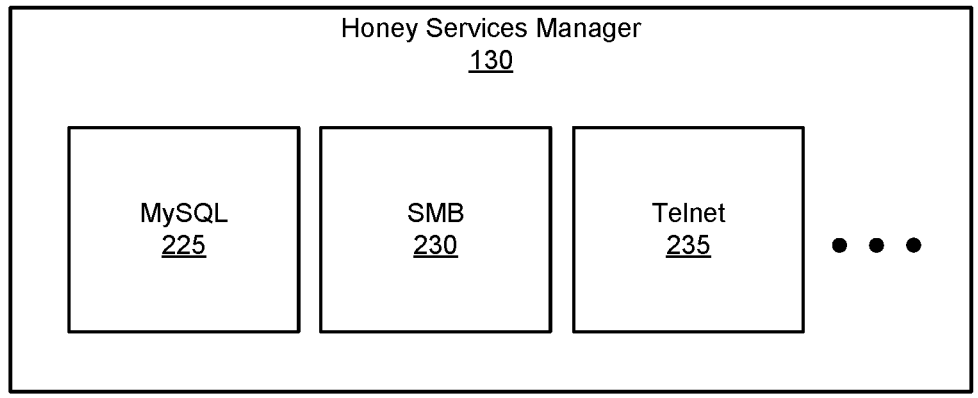
FIG. 2B is a block diagram 200B of a honey services manager, according to one embodiment of the present disclosure.

FIG. 2B is a block diagram 200B of a honey services manager, according to one embodiment. Honeypot 105 exposes honey services 135(1)-(N) which, by protocol design (e.g., authentication requirements, and the like), exchange encrypted or hashed credentials (e.g., user ID and/or password). Examples of such honey services that are constrained by opaque credential exchange because of protocol requirements include, but are not limited to, MySQL, SMB, Telnet, PostgreSQL, and the like. Various other types of communication, client/server, network, and storage protocols and protocol constrained honey services are contemplated by the disclosure.

Example Lookup Tables for Honeypot Opaque Credential Recovery

FIG. 2C is a block diagram 200C of initial list 210, according to one embodiment. Initial list 210 is a list of common or likely passwords to seed protocol specific plaintext lookup table 220 upon startup of honeypot 105 or initiation of a new honey service. As shown in FIG. 2C, initial list 210 includes several common or likely passwords (e.g., password, Password1, Summer 2018, God, love, admin, and more).

FIG. 2D is a block diagram 200D of protocol specific plaintext lookup table 220, according to one embodiment. Protocol specific plaintext lookup table 220 includes plaintext 240, opaque 245, salt 250, and metadata 255. Plaintext 240 is seeded with plaintext credentials (Password 1 and password) and the corresponding opaque credentials (2AFFC6DA and AAFCD72A) and salts (1A2B3C and 4D5E6F), as well as contexts 260(1) and 260(2), respectively (the respectively context in which those credentials were presented to the honeypot—e.g., the application or honey service that an attacker sought to authenticate, in addition to other metadata such as attack vectors, attack time, attack source, and the like).

FIG. 2E is a block diagram 200E of plaintext lookup table 215, according to one embodiment. As noted, plaintext lookup table 215 includes plaintext values for credential manager 110 to determine whether a given value (e.g., credential) has been previously observed by or presented to honeypot 105 (e.g., password).

Example of Performing Honeypot Opaque Credential Recovery

Figure 4A:
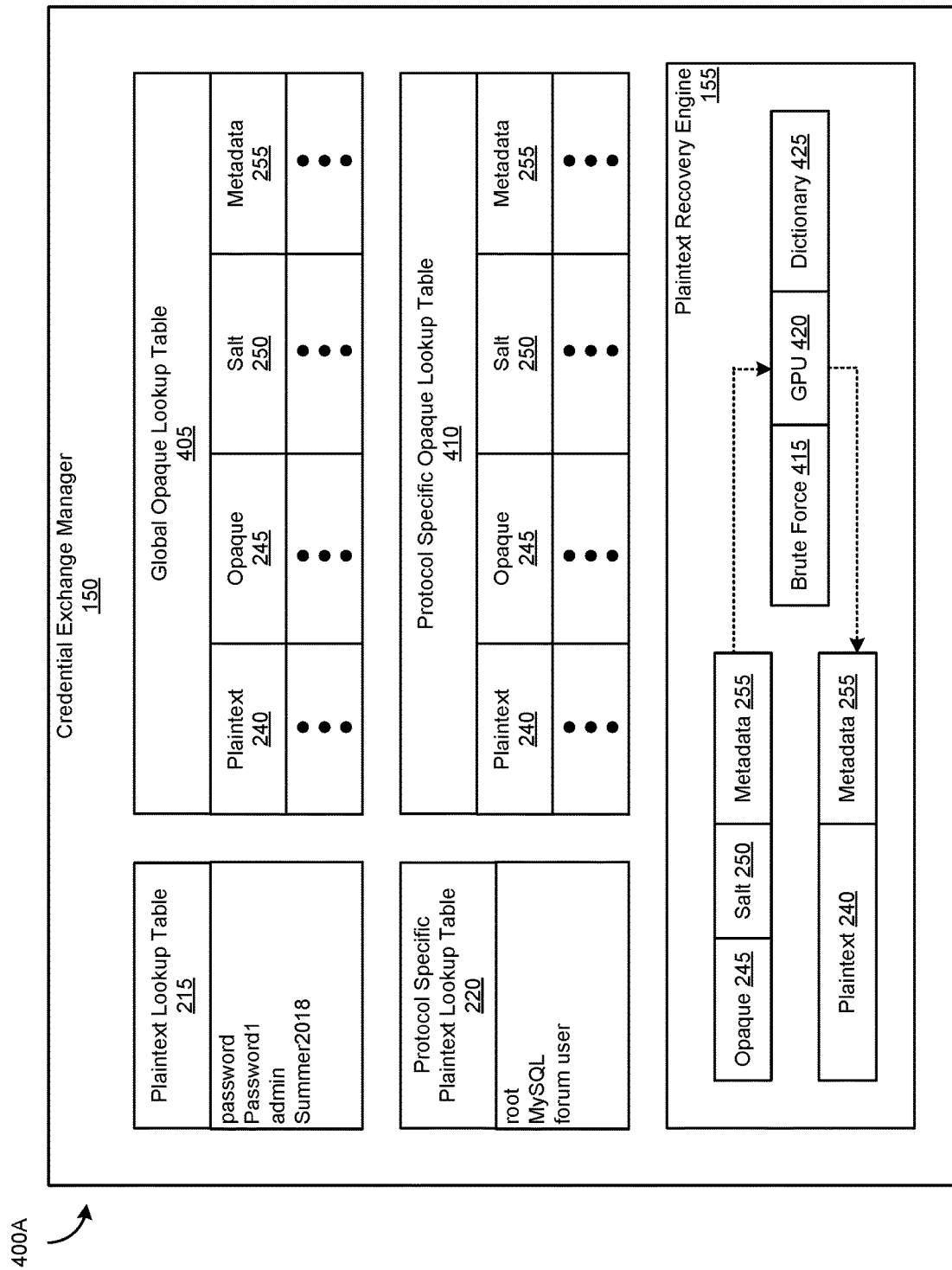
FIG. 4A is a block diagram 400A of a credential exchange manager, according to one embodiment of the present disclosure.

In one embodiment, credential manager 110 receives a plaintext credential at honeypot 105, accesses plaintext lookup table 215, determines that the plaintext credential does not exist in plaintext lookup table 215, adds the plaintext credential to the plaintext lookup table 215 and to protocol specific plaintext lookup table 220, generates an opaque credential for the plaintext credential, and adds the opaque credential to a protocol specific opaque lookup table (e.g., a protocol specific opaque lookup table that is maintained by credential exchange manager 150 in honeypot management server 145 as shown in FIG. 4A, infra).

In some embodiments, the plaintext credential is received from an original attacker (e.g., attacker 160(1)) and the original attacker initiates an original attack event. In this example, credential manager 110 generates attack context metadata associated with the original attack event (e.g., context 260(1) that is initially stored as metadata 255 in protocol specific plaintext lookup table 220 as shown in FIG. 2D) and (further) stores the attack context metadata (e.g., context 260(1)) in the protocol specific opaque lookup table in association with the plaintext credential and the opaque credential. Therefore, the context of an attack event is first/initially maintained in a local table of plaintext values and is then added to a per protocol opaque lookup table (e.g., to facilitate attack context determination and plaintext credential recovery using just an opaque credential that is received subsequently).

In other embodiments, credential manager 110 receives the (same) opaque credential at honeypot 110 from a subsequent attacker (e.g., attacker 160(2)) that initiates a subsequent attack event. Credential manager 110 accesses the protocol specific opaque lookup table and recovers the plaintext credential associated with the opaque credential. In one embodiment, credential exchange manager 150 performs a registration operation with credential manager 110 by providing a table identifier and a protocol methodology and populating plaintext lookup table 215 from initial list 210 (e.g., a plaintext password list) (with the recovered plaintext credential).

In certain embodiments, credential manager 110 stores the opaque credential in a log generated for the original attack event or determines whether the opaque credential is included in a list of credentials honeypot 105 is configured to consider valid. In this example, credential manager 110 exchanges the plaintext credential, the opaque credential, and the attack context metadata with credential exchange manager 150 (e.g., for the later or subsequent recovery of the corresponding plaintext credential of an opaque credential if the opaque credential is presented to the honeypot as part of a later or subsequent attack or attack event, as discussed above).

Figure 3A:
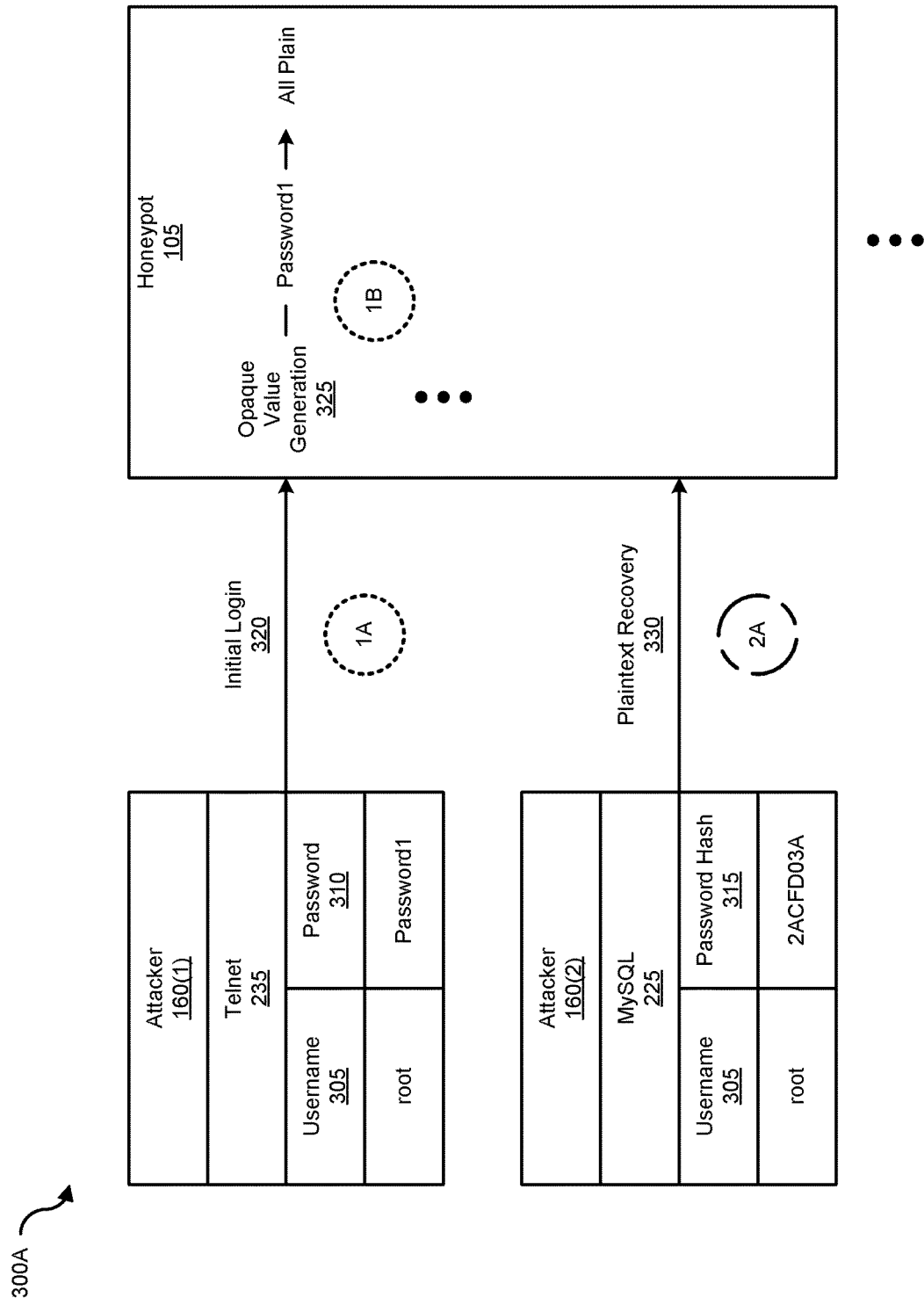
FIG. 3A is a block diagram 300A a honeypot that performs plaintext recovery, according to one embodiment of the present disclosure.

Example Honeypot Opaque Credential Recovery Lifecycle—Initialization and Operations FIG. 3A is a block diagram 300A a honeypot that performs plaintext recovery, according to one embodiment. In one embodiment, attacker 160(1) performs initial login 320 to telnet 235 using username 305 (e.g., root) and password 310 (e.g., Password1) (shown as step 1A in FIG. 3A). Honeypot 105 observes password "Password1" for the first time. "Password1" is added to plaintext lookup table 215 and/or protocol specific plaintext lookup table 220 (e.g., a default list or a protocol specific local table of plaintext values) and opaque value generation 325 is performed for registered hash types (e.g. for MySQL the opaque value for "Password1" is "2ACFD03A") (shown in step 1B in FIG. 3A).

In another embodiment, attacker 160(2) logs into MySQL 225 on honeypot 105 with the opaque hash "2ACFD03A." In this example, credential manager 110 finds the hash plaintext by looking up the value "2ACFD03A" in a per protocol opaque lookup table for MySQL (e.g., a protocol specific opaque lookup table that is maintained by credential exchange manager 150 in honeypot management server 145 as shown in FIG. 4A, infra). The query results in the recovery of plaintext credentials—the plaintext value "Password1" (shown as step 2A in FIG. 3A).

For example, in some embodiments, during startup of a new honey service (e.g., honey service 135(1)), credential management engine 115 registers with credential manager 105 by providing a label (e.g., a lookup table identifier) to lookup table engine 120 and the protocol methodology (e.g., SHA-512) to protocol management engine 125. If the protocol/hashing methodology requires a salt, a nonce, or other comparable value, such values are registered at the table level. Alternatively, in the case of dynamic values, such values are provided on a per-call basis when adding entries.

In other embodiments, the plaintext password list (e.g., initial list 210) is read and passed through the table specific algorithm to populate the lookup table (e.g., protocol specific plaintext lookup table 220). As noted, the lookup table can be either a default list (e.g., plaintext lookup table 215)

or a protocol specific list (e.g., protocol specific plaintext lookup table 220). If the honey service is configured to permit access only to specific credentials, then these credentials are registered with credential manager 110 for the honey service's lookup table as well (e.g., protocol specific plaintext lookup table 220). Further, if the honeypot supports and is configured to use credential exchange manager 150, then credential manager 110 makes a request for current information which is then registered or ingested as appropriate.

FIG. 3B is a block diagram of a credential manager that performs opaque credential recovery, according to one embodiment. FIG. 3B illustrates log output data:

{
..."utcts": "2018-10-17T14:56:55.415948Z",
..."proto": "tcp",
..."src": "58.218.66.93",
..."dst": "10.0.17.189",
..."sport": 4386,
..."dport": 3306,
..."hb.connection class": "mysqld",
..."event": "dionaea.modules.python.mysql.login",
..."auth_method": "mysql",
..."username": "root",
..."password": null,
..."password.hash":
   "adcfee865fe383e4a7fa4e8813a70dc7c4f3bf38",
..."ref": "conn-b86f6458-8b71-4f1a-9d98-14b77cc1a5ce"
}

In one embodiment, when honeypot 105 observes credentials sent in plaintext, honeypot 105 passes the plaintext credentials to credential manager 110. Credential manager 110 checks the plaintext lookup table (e.g., initial list 210) to determine whether the credentials have been seen before. If the credentials have not been seen before, credential manager 110 adds an entry to each of the registered protocol specific lookup tables.

In another embodiment, the plaintext check process is triggered directly by credential manager 110 (e.g., by credential management engine 115 or any other module/engine in honeypot 105) or is triggered by including credential information in standardized data structures or fields during the event logging process of the credential managers (or the event logging process of other modules or managers in honeypot 105).

In certain embodiments, when honeypot 105 observes credentials for a protocol that has a (corresponding) lookup table, honeypot 105 calls credential manager 110 to perform a lookup to determine whether the lookup table includes the corresponding plaintext value. If the lookup table includes the corresponding plaintext value, credential manager 110 performs one or more operations with the plaintext value (e.g., including the plaintext value in logs generated for related attack event(s) or determining whether the plaintext value is part of a list of credentials the honeypot is configured to consider 'valid').

In some embodiments, in order to maintain or preserve the value of the captured plaintext (e.g., for future operations, as noted above, or to share with other honeypots in the honeypot ecosystem), the honeypot saves the aggregated list of plaintext values to disk (e.g., to a physical storage device, to memory, to a cache, and the like) at a configurable schedule (e.g., after an attack event or after a predetermined period of time, and the like) and/or during shutdown (of a given honey service or the honeypot itself).

As noted, and in other embodiments, if the honeypot is configured to use credential exchange manager 150, the honeypot contacts the credential exchange(s) to submit and/or request data of value such as plaintext credentials, observations of the frequency of credential use, the attack context of credential use, and the like, at a configurable internal and/or during shutdown (of the given honey service or the honeypot itself).

In one embodiment, if the honeypot is not shutting down, then then new information is registered or ingested as appropriate. In this example, credential usage frequency information can be used by the honeypot to determine which lookup table values to retain when operating in a resource constrained (e.g., network resources, memory resources, and the like) computing environment (e.g., retaining only lookup table values that are accessed a certain number of times and/or within a certain time period).

Example of Performing Credential Exchange in a Honeypot Ecosystem

FIG. 4A is a block diagram 400A of a credential exchange manager, according to one embodiment. Credential exchange manager 150 includes plaintext lookup table 215, protocol specific plaintext lookup table 220, global opaque lookup table 405, and protocol specific opaque lookup table 410, and plaintext recovery engine 155. Plaintext lookup table 215 includes plaintext values/credentials encountered by honeypot 105 and protocol specific plaintext lookup table 220 includes plaintext values/credentials tied to a specific protocol (e.g., MySQL, SMB, PostgreSQL, and the like) encountered by honeypot 105.

Global opaque lookup table 405 includes plaintext 240 and corresponding opaque 245, salt 250, and metadata 255 for multiple protocols and/or registered hash types (e.g., for MySQL with MD-5 hashing). Similarly, protocol specific opaque lookup table 410 includes plaintext 240 and corresponding opaque 245, salt 250, and metadata 255 for a single protocol (e.g., for MySQL with MD-5 hashing).

As shown in FIG. 4A, credential exchange manager 150 also includes plaintext recovery engine 155 which processes opaque credentials (e.g., a combination of opaque 245, salt 250, and metadata 255) to recover plaintext credentials (e.g., a combination of plaintext 240 and metadata 255). In this example, plaintext recovery engine 155 processes opaque credentials by performing one or more of a brute force 415, a graphics processing unit (GPU) 420, or a dictionary 245 attack(s) to recover plaintext credentials.

Figure 4B:
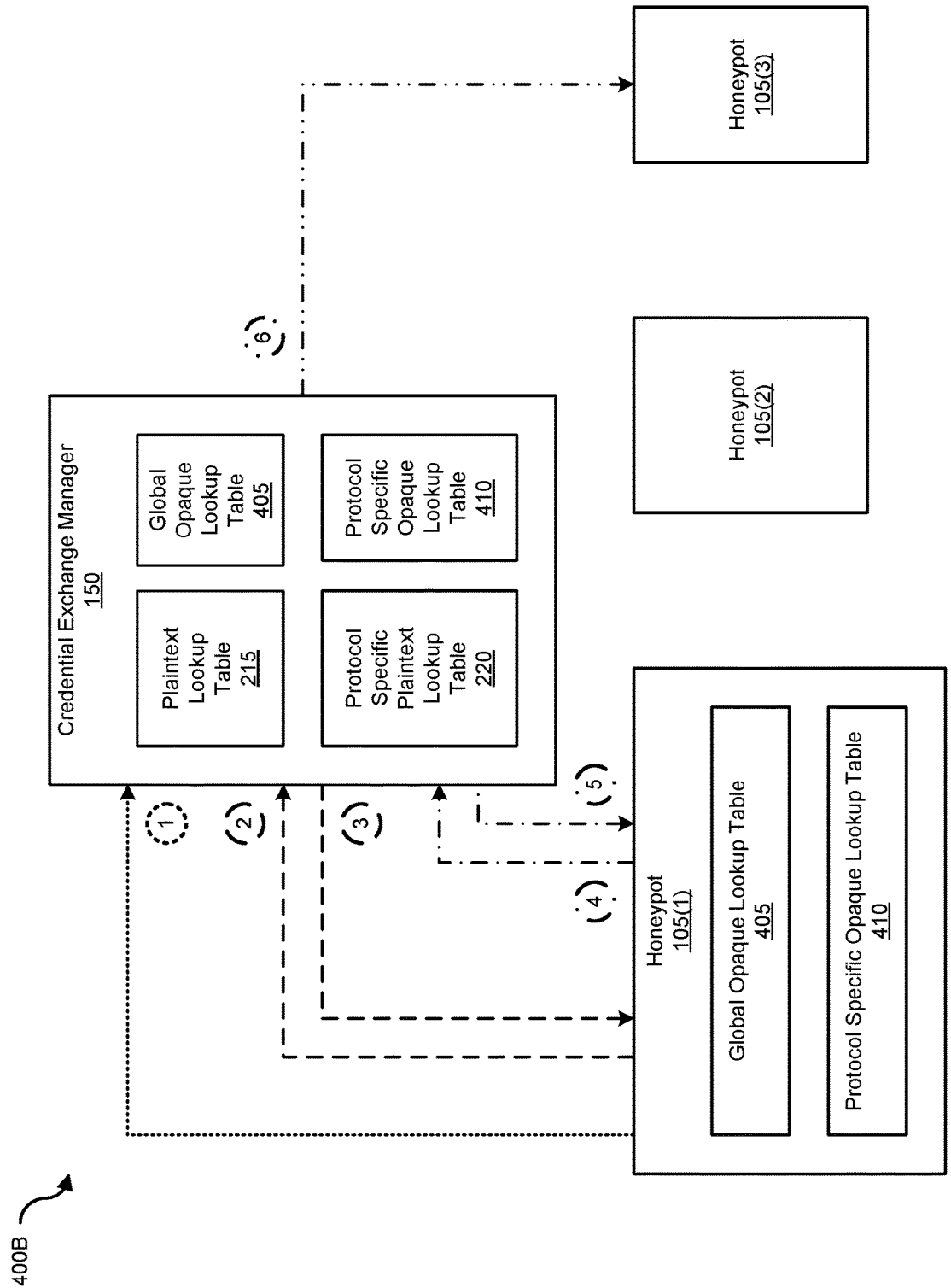
FIG. 4B is a block diagram 400B of a credential exchange manager interacting with one or more honeypots, according to one embodiment of the present disclosure.

FIG. 4B is a block diagram 400B of a credential exchange manager interacting with one or more honeypots, according to one embodiment. In step 1, honeypot 105(1) observes new plaintext "Winter2018" and at step 2, sends the newly observed plaintext to credential exchange manager 150 (e.g., to be stored in plaintext lookup table 215 and/or protocol specific plaintext lookup table 220). In step 3, credential exchange manager 150 sends a global plaintext list to honeypot 105(1) (e.g., global opaque lookup table 405). In step 4, honeypot 105(1) encounters an unknown opaque credential and credential exchange manager 150 recovers the plaintext credential and in step 5, sends the recovered plaintext to honeypot 105(1). In step 6, credential exchange manager 150 sends the global plaintext list (e.g., plaintext lookup table 215) with new value(s) ("Winter2018") to honeypot 105(3).

In one embodiment, plaintext credential datastores include compilations of plaintext credentials (e.g., plaintext lookup table 215 which is global or protocol specific plaintext lookup table 220 which is protocol specific). The credential datastores can also include frequency of observation information. Credential exchange manager 150 includes plaintext recovery engine 155 that implements opaque credential recovery mechanisms for recovering the plaintext values of opaque credentials. Such mechanisms or components include, but are not limited to, large lookup tables that translate opaque credentials to plaintext and processes for performing brute force, dictionary, or other attacks against opaque credentials that for resource or other reasons, do not lend themselves to using precomputed lookup tables (e.g., credentials that are generated using algorithms that leverage a salt in the computation process).

In another embodiment, credential exchange manager 150 includes application programming interfaces (APIs) or other endpoints that enable clients (e.g., honeypots 105(1)-(3) as shown in FIG. 4B) to exchange data and/or make requests for recovery of opaque credentials and facilitate injection of credentials of interest by operators or other systems. In this example, credential exchange manager 150 also includes processes for deriving credential usage frequency and generating new plaintext lists at a global or per protocol level as well as processes for providing statistical data and other telemetry related credential usage within the managed environment (e.g., a honeypot ecosystem as shown in FIG. 1).

Example Processes to Perform Honeypot Opaque Credential Recovery

Figure 5:
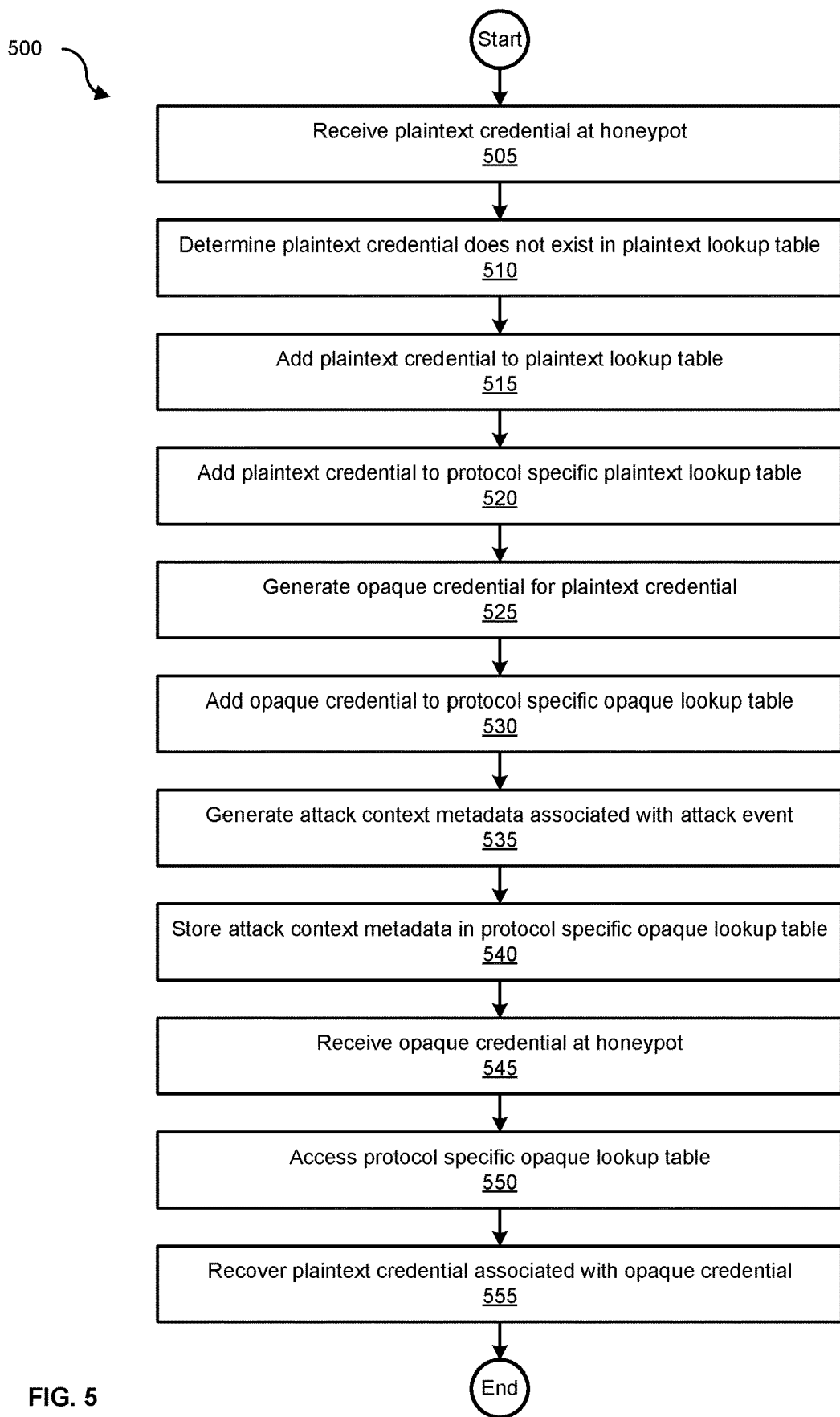
FIG. 5 is a flowchart 500 that illustrates a process for recovering plaintext credentials associated with opaque credentials, according to one embodiment of the present disclosure.

FIG. 5 is a flowchart 500 that illustrates a process for recovering plaintext credentials associated with opaque credentials, according to one embodiment. The process begins at 505 by receiving a plaintext credential at a honeypot (e.g., initial login 320 of username 305 of 'root' and password 310 of 'Password1' as shown in FIG. 3A), and at 510, determines that the plaintext credential does not exist in a plaintext lookup table (e.g., plaintext lookup table 215).

At 515, the process adds the plaintext credential to the plaintext lookup table (e.g., plaintext lookup table 215) and at 520, adds the plaintext credential to a protocol specific plaintext lookup table (e.g., protocol specific plaintext lookup table 220). At 525, the process generates a corresponding opaque (hashed) credential for the plaintext credential (e.g., opaque value generation 325 as shown in FIG. 3A).

At 530, the process adds the opaque credential to a protocol specific opaque lookup table (e.g., protocol specific opaque lookup table 410 in honeypot 105(1) as shown in FIG. 4B). At 535, the process generates attack context metadata associated with an attack event (e.g., context 260(1)). Attack context metadata includes, but is not limited to, attack vectors, exploits used, vulnerabilities targeted, protected resources on production systems sought by the attacker, and the like. At 540, the process stores the attack context metadata in the protocol specific opaque lookup table (e.g., to perform plaintext credential recovery).

At 545, the process receives an opaque credential at a honeypot (e.g., as part of the same attack event or as part of a different/separate/subsequent attack event), and at 550, access the protocol specific lookup table. The process ends at 555 by recovering the plaintext credential associated with the opaque credential (e.g., by using a brute force, GPU, dictionary, or any other type of password attack methodology performed by plaintext recovery engine 155).

Figure 6A:
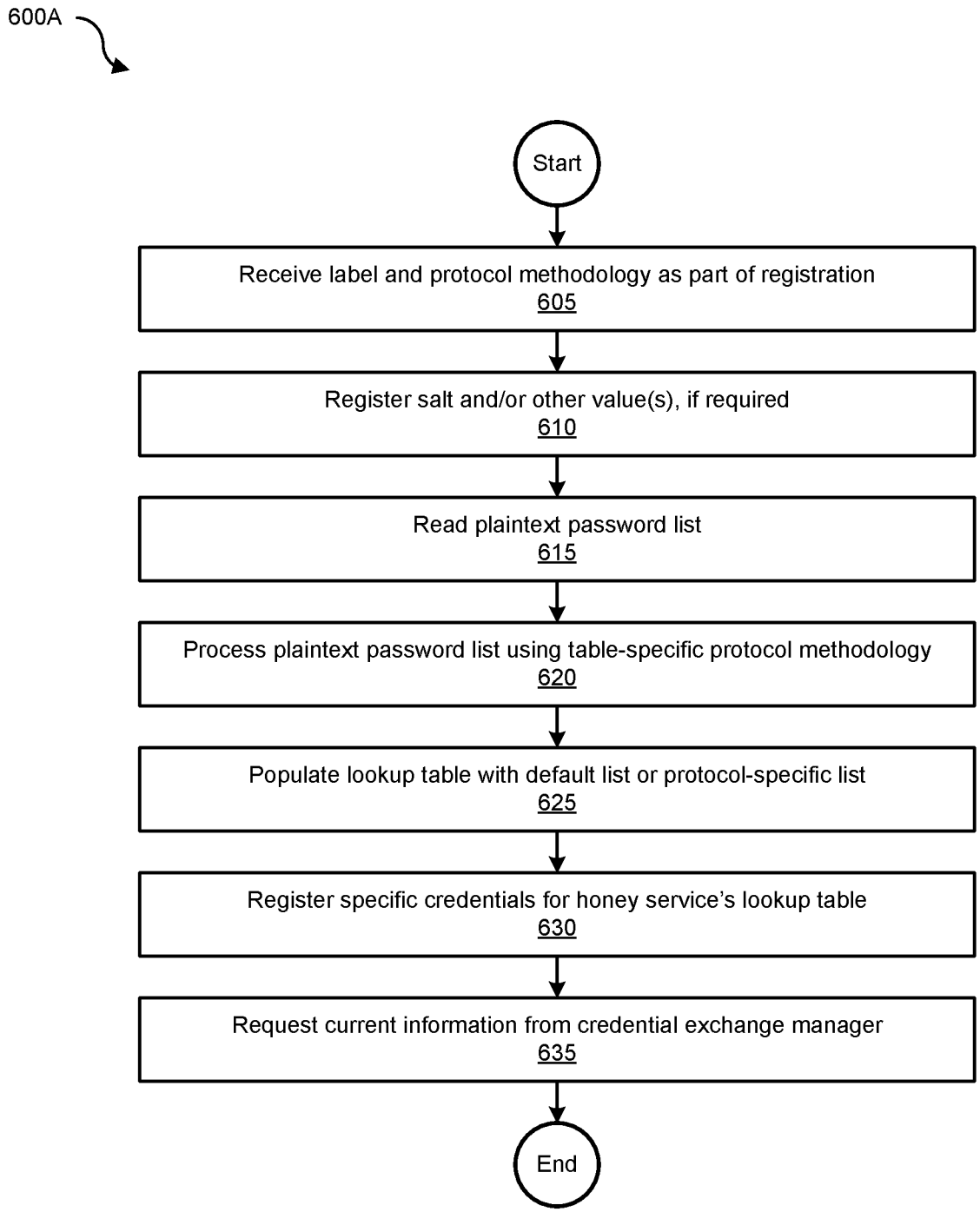
FIG. 6A is a flowchart 600A that illustrates a process for requesting current information from a credential exchange manager, according to one embodiment of the present disclosure.

FIG. 6A is a flowchart 600A that illustrates a process for requesting current information from a credential exchange manager, according to one embodiment. The process begins at 605 by receiving a label and a protocol methodology as part of a registration process, and at 610, registers a salt and/or other value(s), if required. At 615, the process reads a plaintext password list, and at 620, processes the plaintext password list using a table-specific protocol methodology (e.g., a particular/specific hashing algorithm that is associated with the table-specific protocol).

At 625, the process populates the lookup table with a default list or a protocol specific list—e.g., generating or updating plaintext lookup table 215 and protocol specific plaintext lookup table 220, respectively. At 630, the process registers specific credentials for the honey service's lookup table (e.g., specific credentials that the honeypot should consider 'valid' if used by a malicious attacker to authenticate with PostgreSQL). The process ends at 635 by requesting current information from credential exchange manager (e.g., credential exchange manager 150).

Figure 6B:
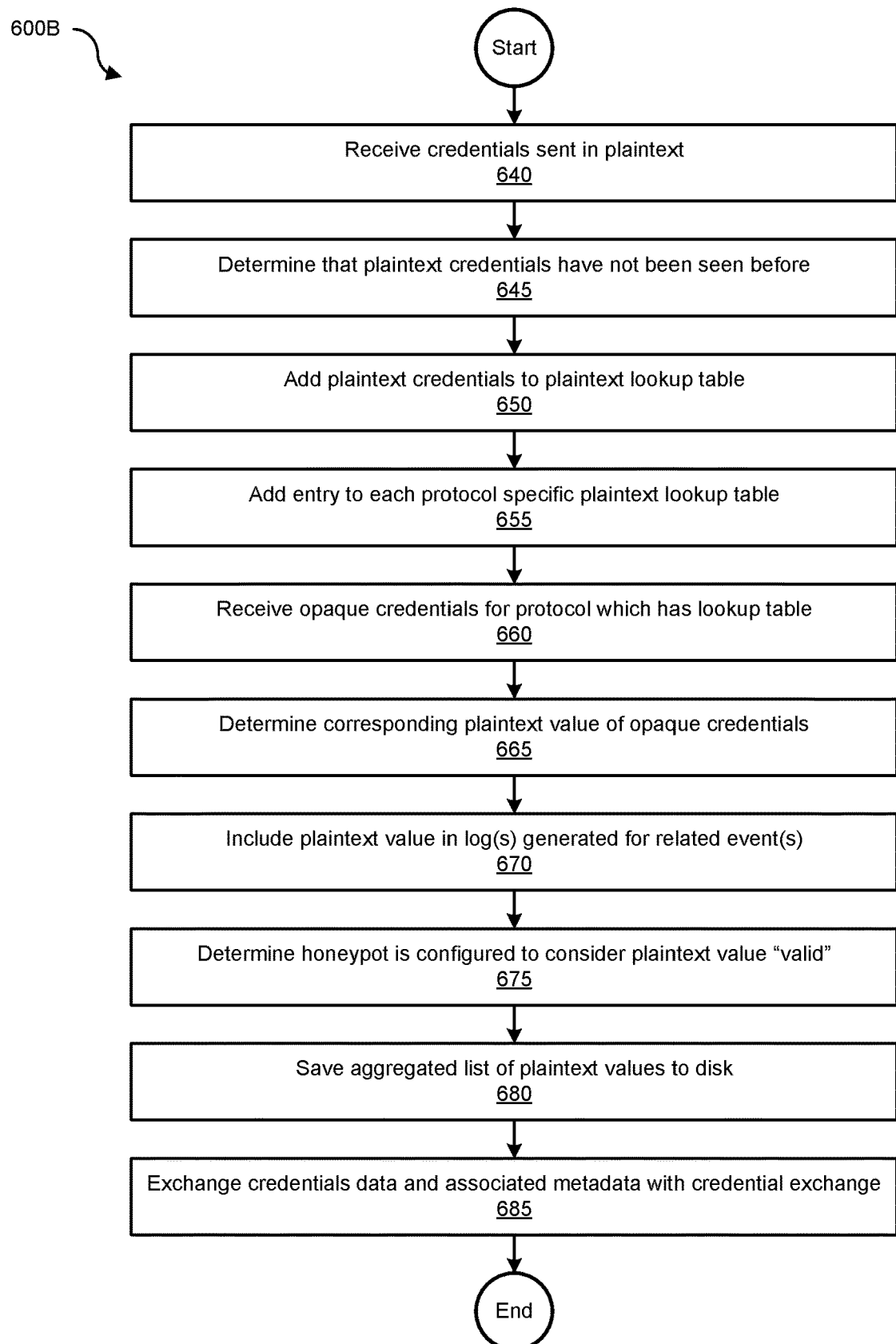
FIG. 6B is a flowchart 600B that illustrates a process for exchanging credentials data and metadata with a credential exchange, according to one embodiment of the present disclosure.

FIG. 6B is a flowchart 600B that illustrates a process for exchanging credentials data and metadata with a credential exchange, according to one embodiment. The process begins at 640 by receiving credentials sent in plaintext, and at 645, determines that the plaintext credentials have not been seen before (e.g., by accessing a plaintext lookup table 215). At 650, the process adds the plaintext credentials to the plaintext lookup table.

At 655, the process adds an entry to each protocol specific plaintext lookup table (e.g., for each registered hash type), and at 660, receives opaque credentials for protocol(s) that have lookup tables. At 665, the process determines the corresponding plaintext value of opaque credentials, and at 670, the process includes the plaintext value in log(s) generated for related event(s) (e.g., attack events).

At 675, the process determines that the honeypot is configured to consider the plaintext value 'valid' (e.g., for authentication purposes), and at 680, saves the aggregated list of plaintext values to disk. The process ends at 685 by exchanging credentials data and associated metadata with credential exchange (e.g., credential exchange manager 150).

Figure 7:
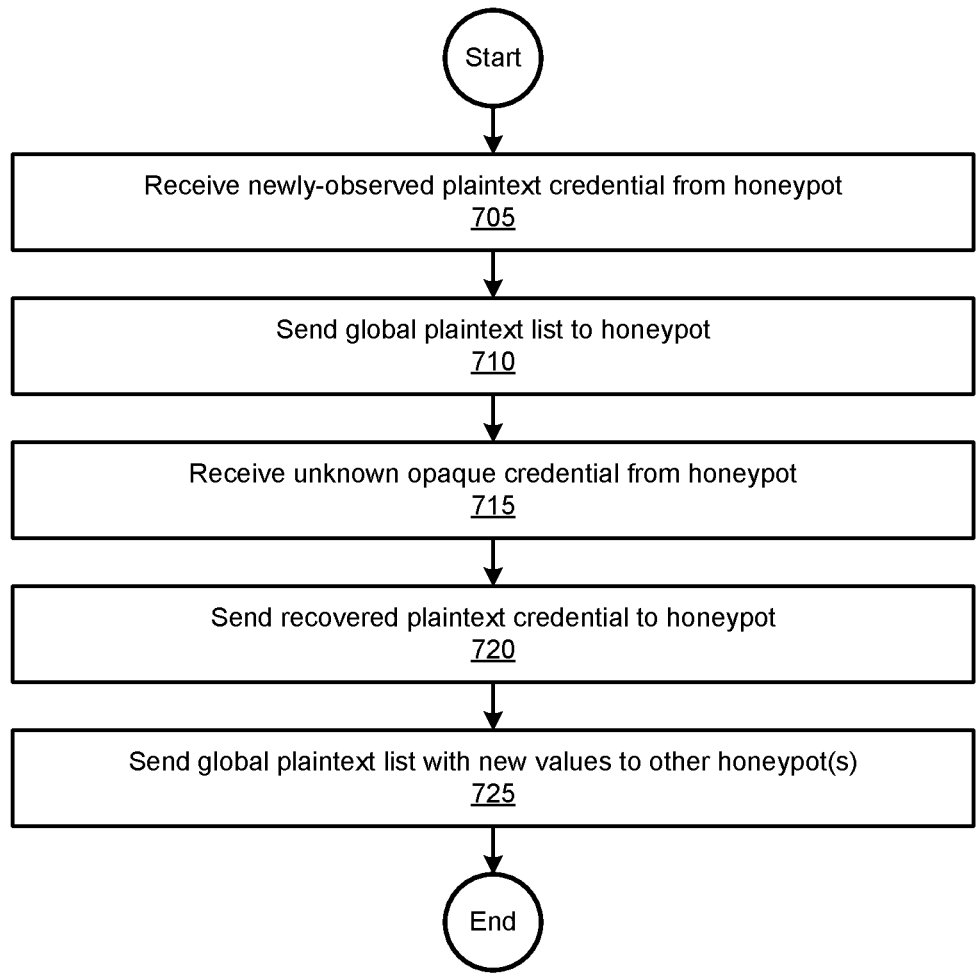
FIG. 7 is a flowchart 700 that illustrates a process for sending a global plaintext list with new values to other honeypots, according to one embodiment of the present disclosure.

FIG. 7 is a flowchart 700 that illustrates a process for sending a global plaintext list with new values to other honeypots, according to one embodiment. The process beings at 705 by receiving a newly-observed plaintext credential from a honeypot (e.g., honeypot 105(1) as shown in FIG. 4B). At 710, the process sends a global plaintext list to the honeypot (e.g., global opaque lookup table 405 and protocol specific opaque lookup table 410 as shown in FIG. 4B).

At 715, the process receives an unknown opaque credential from the honeypot, and at 720, sends (the corresponding) recovered plaintext credential to the honeypot (e.g., by using a brute force, GPU, dictionary, or other type of password attack methodology performed by plaintext recovery engine 155). The process ends at 725 by sending the global plaintext list with new values to other honeypot(s) (e.g., as shown in FIG. 4B with respect to honeypot 105(3)).

In this manner, the methods, systems, and processes facilitate the recovery and logging of plaintext values corresponding to opaque credentials within the original context of the attack, limit access to specific 'valid' credentials for protocols that exchange opaque credentials and gather and leverage credentials used by attackers that would not otherwise be included within common credential lists.

Therefore, recovering opaque credentials in deception systems using and/or implementing the disclosed methods, systems, and/or processes disclosed herein provides, among other benefits, the identification of plaintext credentials used by malicious attackers and the ability to configure honeypots to accept specific credentials.

Example Computing Environment

Figure 8:
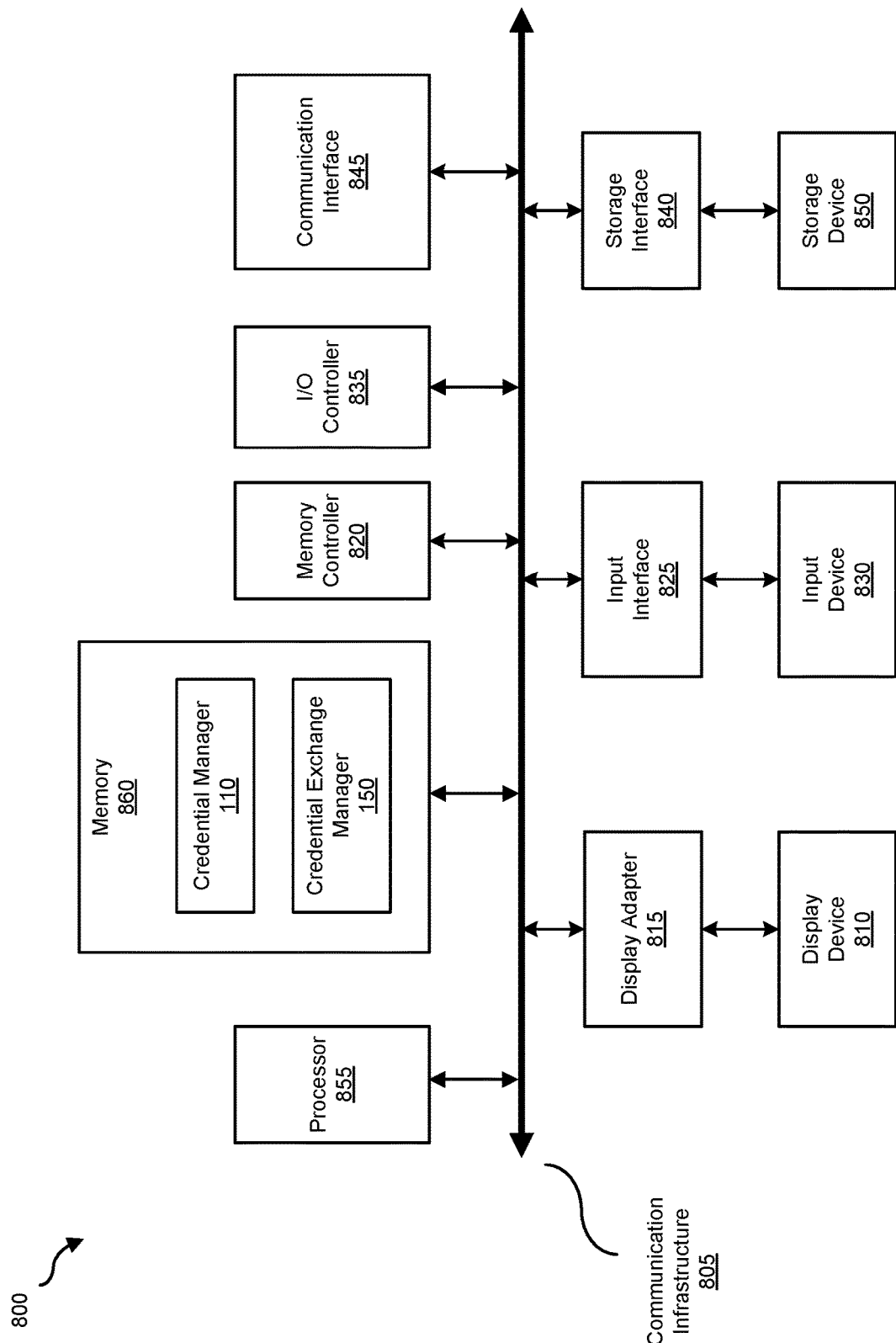
FIG. 8 is a block diagram 800 of a computing system, illustrating how a credential manager and/or a credential exchange manager can be implemented in software, according to one embodiment of the present disclosure.

FIG. 8 is a block diagram 800 of a computing system, illustrating how a credential manager and/or credential exchange manager can be implemented in software, according to one embodiment. Computing system 800 can include penetration testing computing device 105 or penetration testing server 305 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes credential manager 110 and/or credential exchange manager 150, computing system 800 becomes a special purpose computing device that is configured to perform or facilitate honeypot opaque credential recovery in cybersecurity computing environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing credential manager 110 and/or credential exchange manager 150 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
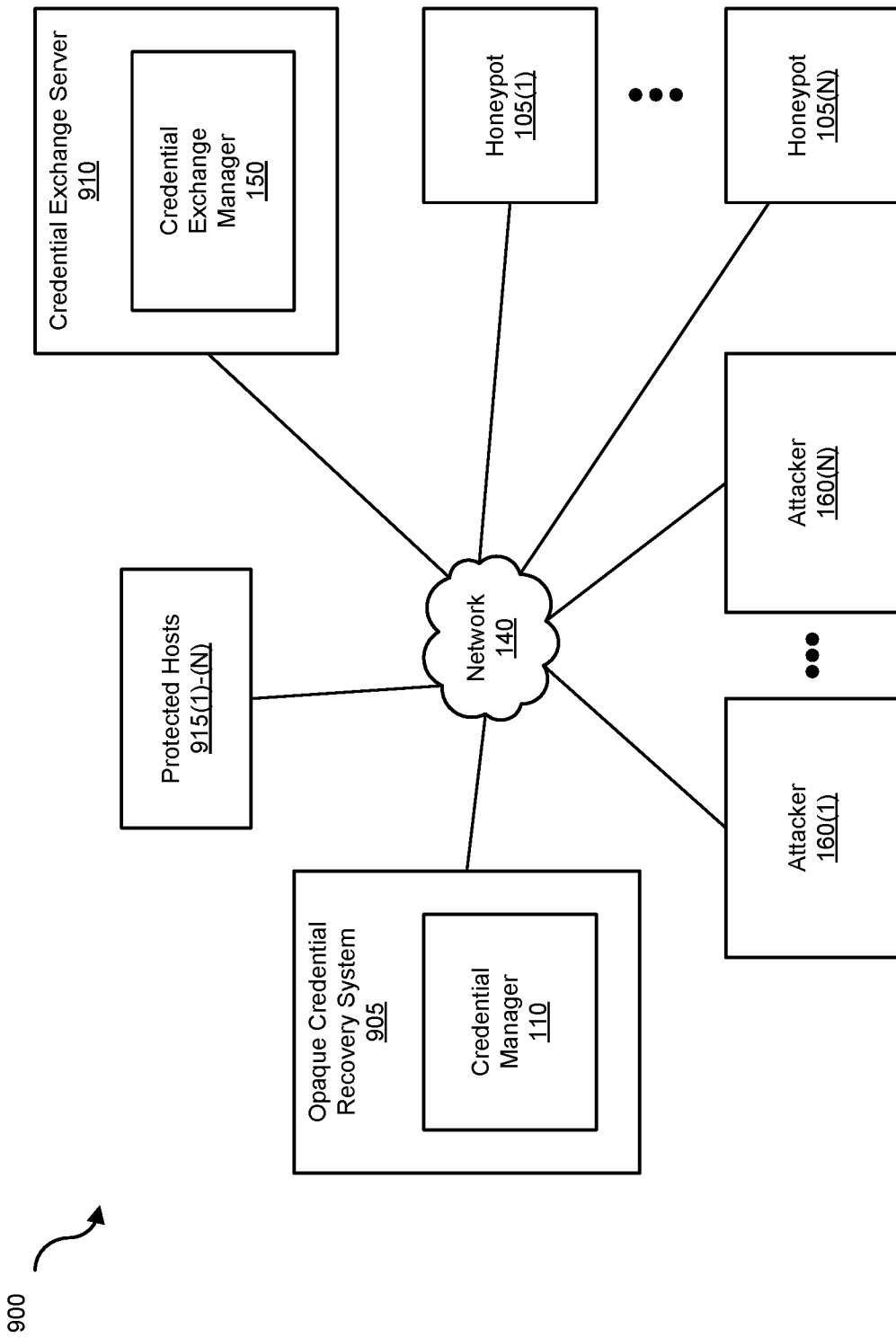
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 140 generally represents any type or form of computer network or architecture capable of facilitating communication between honeypot 105 and honeypot management server 145. For example, network 140 can be a Wide Area Network (WAN) (e.g., the Internet) or a Local Area Network (LAN). In certain embodiments, a communication interface, such as communication interface 845 in FIG. 8, may be used to provide connectivity between honeypot 105 and honeypot management server 145, and network 140. The embodiments described and/or illustrated herein are not limited to the Internet or any particular network-based environment.

In some embodiments, credential manager 110 and credential exchange manager 150 may be part of honeypot 105 and honeypot management server 145, respectively, or may be separate. If separate, honeypot 105 and honeypot management server 145 may be communicatively coupled via network 140. In one embodiment, all or a portion of one or more of embodiments may be encoded as a computer program and loaded onto and executed by opaque credential recovery system 905, credential exchange server 910, honeypot 105 and/or honeypot management server 145, or any combination thereof, and may be stored on credential recovery system 905, credential exchange server 910, honeypot 105 and/or honeypot management server 145, and distributed over network 140.

In some examples, all or a portion of opaque credential recovery system 905, credential exchange server 910, honeypot 105 and/or honeypot management server 145 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, credential manager 110 and/or credential exchange manager 150 may transform the behavior of opaque credential recovery system 905, credential exchange server 910, honeypot 105 and/or honeypot management server 145 to perform honeypot opaque credential recovery.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
receiving a plaintext credential at a honeypot;
accessing a plaintext lookup table;
determining that the plaintext credential does not exist in the plaintext lookup table;
adding the plaintext credential to the plaintext lookup table and to a protocol specific plaintext lookup table;
associating the plaintext credential in the plaintext lookup table to a specific protocol used by the honeypot for hashed credential exchange;
adding an attack context in which the plaintext credential was presented to the honeypot to the protocol specific plaintext lookup table;
generating an opaque credential for the plaintext credential; and
adding the opaque credential in association with the attack context and the specific protocol for the hashed credential exchange to a protocol specific opaque lookup table.

2. The computer-implemented method of claim 1, further comprising:
performing a registration operation with a credential manager by providing a table identifier and a protocol methodology; and
populating the plaintext lookup table from a plaintext password list.

3. The computer-implemented method of claim 1, wherein
the plaintext credential is received from an original attacker, and
the original attacker initiates an original attack event.

4. The computer-implemented method of claim 3, further comprising:
generating attack context metadata associated with the original attack event that comprises the attack context; and
storing the attack context metadata in the protocol specific opaque lookup table in association with the plaintext credential and the opaque credential.

5. The computer-implemented method of claim 4, further comprising:

receiving the opaque credential at the honeypot, wherein
the opaque credential is received from a subsequent
attacker, and
the subsequent attacker initiates a subsequent attack
event;
accessing the protocol specific opaque lookup table;
determining that the opaque credential received from the
subsequent attacker as part of the subsequent attack
event requires the specific protocol in the protocol
specific opaque lookup table for the hashed credential
exchange; and
recovering the plaintext credential associated with the
opaque credential.

6. The computer-implemented method of claim 4, further comprising:
storing the opaque credential in a log generated for the original attack event, or
determining whether the opaque credential is comprised in a list of credentials the honeypot is configured to consider valid.

7. The computer-implemented method of claim 4, further comprising:
exchanging the plaintext credential, the opaque credential, and the attack context metadata with a credential exchange manager.

8. A non-transitory computer readable storage medium comprising program instructions executable to:
receive a plaintext credential at a honeypot;
access a plaintext lookup table;
determine that the plaintext credential does not exist in the plaintext lookup table;
add the plaintext credential to the plaintext lookup table and to a protocol specific plaintext lookup table;
associate the plaintext credential in the plaintext lookup table to a specific protocol used by the honeypot for hashed credential exchange;
add an attack context in which the plaintext credential was presented to the honeypot to the protocol specific plaintext lookup table;
generate an opaque credential for the plaintext credential; and
add the opaque credential in association with the attack context and the specific protocol for the hashed credential exchange to a protocol specific opaque lookup table.

9. The non-transitory computer readable storage medium of claim 8, further comprising:
performing a registration operation with a credential manager by providing a table identifier and a protocol methodology; and
populating the plaintext lookup table from a plaintext password list.

10. The non-transitory computer readable storage medium of claim 8, wherein
the plaintext credential is received from an original attacker, and
the original attacker initiates an original attack event.

11. The non-transitory computer readable storage medium of claim 10, further comprising:
generating attack context metadata associated with the original attack event that comprises the attack context; and
storing the attack context metadata in the protocol specific opaque lookup table in association with the plaintext credential and the opaque credential.

12. The non-transitory computer readable storage medium of claim 11, further comprising:
receiving the opaque credential at the honeypot, wherein
the opaque credential is received from a subsequent
attacker, and
the subsequent attacker initiates a subsequent attack
event;
accessing the protocol specific opaque lookup table;
determining that the opaque credential received from the
subsequent attacker as part of the subsequent attack
event requires the specific protocol in the protocol
specific opaque lookup table for the hashed credential
exchange; and
recovering the plaintext credential associated with the
opaque credential.

13. The non-transitory computer readable storage medium of claim 11, further comprising:
storing the opaque credential in a log generated for the original attack event, or determining whether the opaque credential is comprised in a list of credentials the honeypot is configured to consider valid.

14. The non-transitory computer readable storage medium of claim 11, further comprising:
exchanging the plaintext credential, the opaque credential, and the attack context metadata with a credential exchange manager.

15. A system comprising:
one or more processors; and
a memory coupled to the one or more processors, wherein the memory stores program instructions executable by the one or more processors to:
receive a plaintext credential at a honeypot;
access a plaintext lookup table;
determine that the plaintext credential does not exist in the plaintext lookup table;
add the plaintext credential to the plaintext lookup table and to a protocol specific plaintext lookup table;
associate the plaintext credential in the plaintext lookup table to a specific protocol used by the honeypot for hashed credential exchange;
add an attack context in which the plaintext credential was presented to the honeypot to the protocol specific plaintext lookup table;
generate an opaque credential for the plaintext credential; and
add the opaque credential in association with the attack context and the specific protocol for the hashed credential exchange to a protocol specific opaque lookup table.

16. The system of claim 15, further comprising:
performing a registration operation with a credential manager by providing a table identifier and a protocol methodology; and
populating the plaintext lookup table from a plaintext password list.

17. The system of claim 15, wherein
the plaintext credential is received from an original attacker, and
the original attacker initiates an original attack event.

18. The system of claim 17, further comprising:
generating attack context metadata associated with the original attack event that comprises the attack context; and
storing the attack context metadata in the protocol specific opaque lookup table in association with the plaintext credential and the opaque credential.

19. The system of claim 18, further comprising:
receiving the opaque credential at the honeypot, wherein the opaque credential is received from a subsequent attacker, and the subsequent attacker initiates a subsequent attack event;

accessing the protocol specific opaque lookup table;

determining that the opaque credential received from the subsequent attacker as part of the subsequent attack event requires the specific protocol in the protocol specific opaque lookup table for the hashed credential exchange; and recovering the plaintext credential associated with the opaque credential.

20. The system of claim 18, further comprising:

storing the opaque credential in a log generated for the original attack event, or determining whether the opaque credential is comprised in a list of credentials the honeypot is configured to consider valid; and exchanging the plaintext credential, the opaque credential, and the attack context metadata with a credential exchange manager.

\* \* \* \* \*